United States Patent
Lim

[19]

[11] Patent Number: 6,094,853
[45] Date of Patent: Aug. 1, 2000

[54] FLOATING BAIT CASTER AND BAIT PROTECTOR WITH DEPTH CONTROL

[76] Inventor: Jesus P. Lim, 1822 W. 257th St., Lomita, Calif. 90717

[21] Appl. No.: 09/148,639

[22] Filed: Sep. 4, 1998

[51] Int. Cl.[7] ........................... A01K 97/04; A01K 91/00
[52] U.S. Cl. .............................. 43/41.2; 43/41; 43/43.11; 43/43.12
[58] Field of Search .................................. 43/43.1, 43.11, 43/43.14, 43.15, 443.87, 44.88, 44.9, 44.91, 41, 41.2, 17, 54.1, 4, 4.5, 44.2, 44.4, 44.6, 44.8, 44.92; D22/147, 148

[56] References Cited

U.S. PATENT DOCUMENTS

| | | | |
|---|---|---|---|
| 2,712,197 | 7/1955 | Lewis | 43/41.2 |
| 2,910,798 | 11/1959 | Bias | 43/41.2 |
| 2,928,202 | 3/1960 | Smerke | 43/43.12 |
| 2,934,850 | 5/1960 | Moe | 43/41.2 |
| 3,163,957 | 1/1965 | Barrett | 43/41.2 |
| 3,178,847 | 4/1965 | Mousseau | 43/41.2 |
| 3,214,858 | 11/1965 | De Yip | 43/41.2 |
| 3,230,659 | 1/1966 | Colling | 43/43.11 |
| 3,303,596 | 2/1967 | Lewis et al. | 43/41.2 |
| 3,643,368 | 2/1972 | Pool | 43/41.2 |
| 4,023,300 | 5/1977 | Vieths | 43/41.2 |
| 4,031,652 | 6/1977 | Johnson | 43/43.12 |
| 4,060,925 | 12/1977 | Bias | 43/41.2 |
| 4,075,777 | 2/1978 | Dalton | 43/41.2 |
| 4,610,104 | 9/1986 | Garcia | 43/41.2 |
| 4,753,030 | 6/1988 | Ziglinski | 43/43.12 |
| 5,456,041 | 10/1995 | Schoeberlein | 43/44.91 |
| 5,784,828 | 7/1998 | Thompson | 43/44.9 |
| 5,784,829 | 7/1998 | Latta | 43/44.91 |

FOREIGN PATENT DOCUMENTS

| | | | |
|---|---|---|---|
| 492739 | 5/1953 | Canada | 43/43.12 |
| 512640 | 5/1955 | Canada | 43/41.2 |
| 524715 | 5/1956 | Canada | 43/43.11 |
| 977652 | 11/1950 | France | 43/41.2 |
| 2391649 | 1/1979 | France | 43/41.2 |
| 349838 | 6/1937 | Italy | 43/41.2 |
| 142142 | 9/1953 | Sweden | 43/41.2 |
| 2019181 | 10/1979 | United Kingdom | 43/41.2 |
| WO 81/00186 | 2/1981 | WIPO | 43/41 |

*Primary Examiner*—Michael J. Carone
*Assistant Examiner*—Fredrick T. French, III
*Attorney, Agent, or Firm*—Timothy Thut Tyson; Ted Masters; Freillich, Hornbaker & Rosen

[57] ABSTRACT

Apparatus (20) for safely casting a fishing hook (500) and fishing line includes a float (22) having a cavity (28) for receiving the bait (501), fishing hook (500), leader (506), and sinker (24). The sinker is slidably received in the mouth (34) of the cavity (28) which is at the front end (30) of the float. The main fishing line (502) is tied to the front of the sinker and passes through a secondary tube (42) inside the float exiting the rear end (32) to the fisherman. Float (22) and installed sinker (24) have a streamlined configuration. The fisherman casts the apparatus over the water (510) using a fishing rod. Upon impact of the apparatus with the water, the sinker continues due to inertia pulling the leader, fishing hook, and bait out of the cavity allowing them to sink into the water.

9 Claims, 7 Drawing Sheets

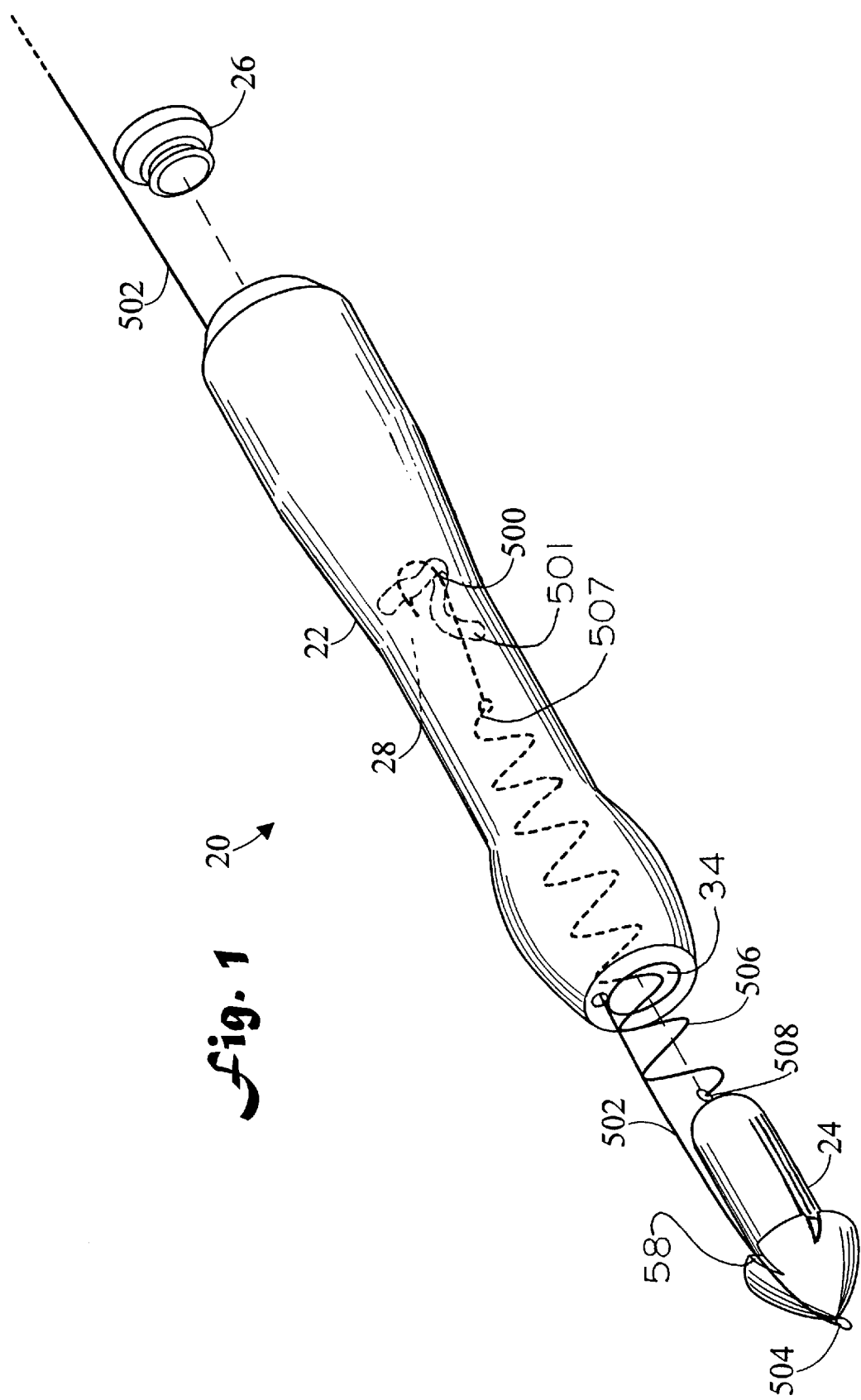

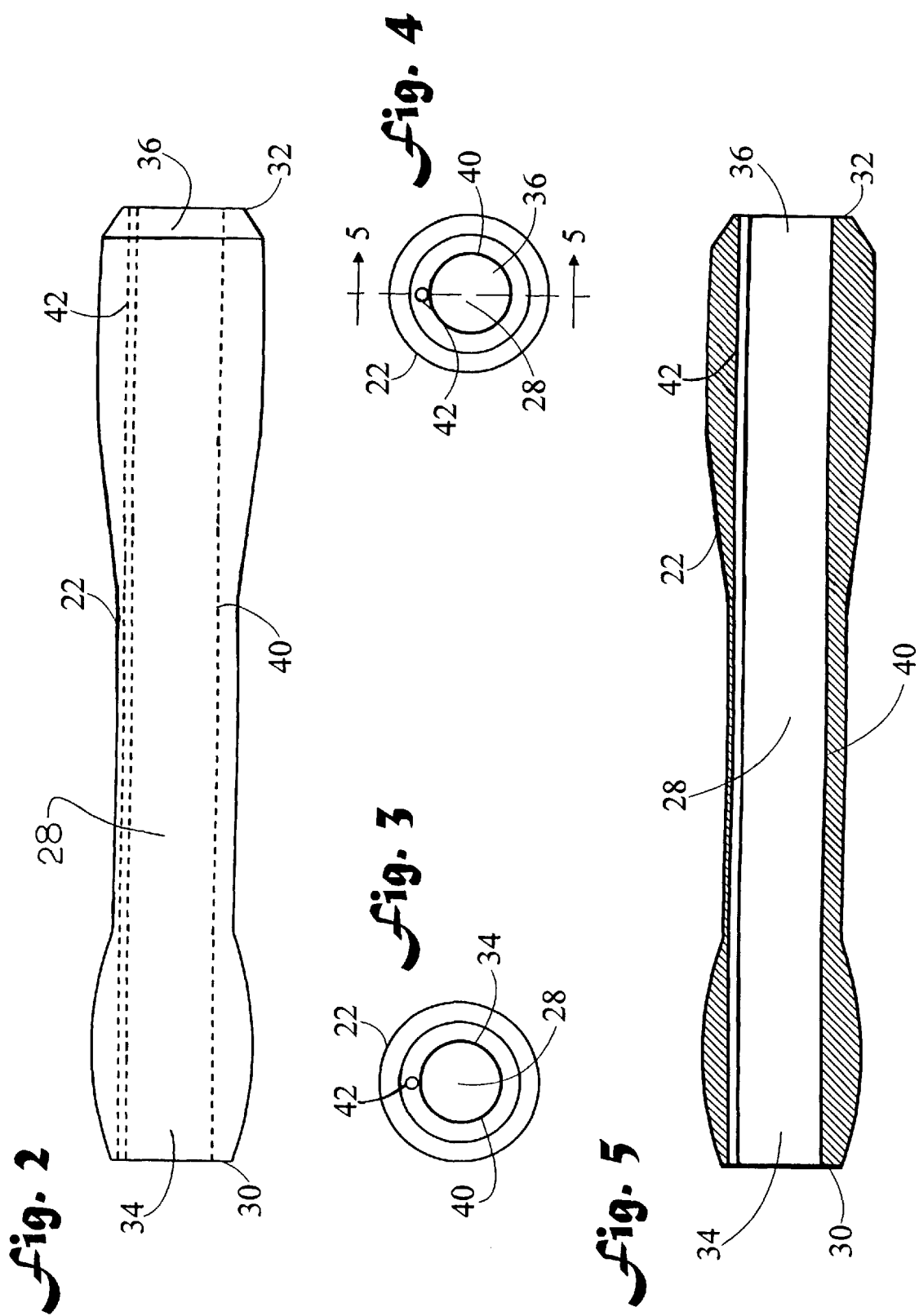

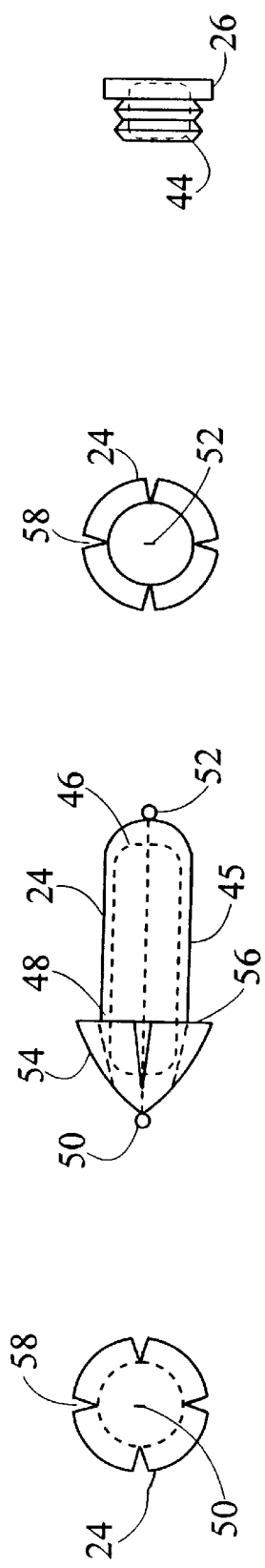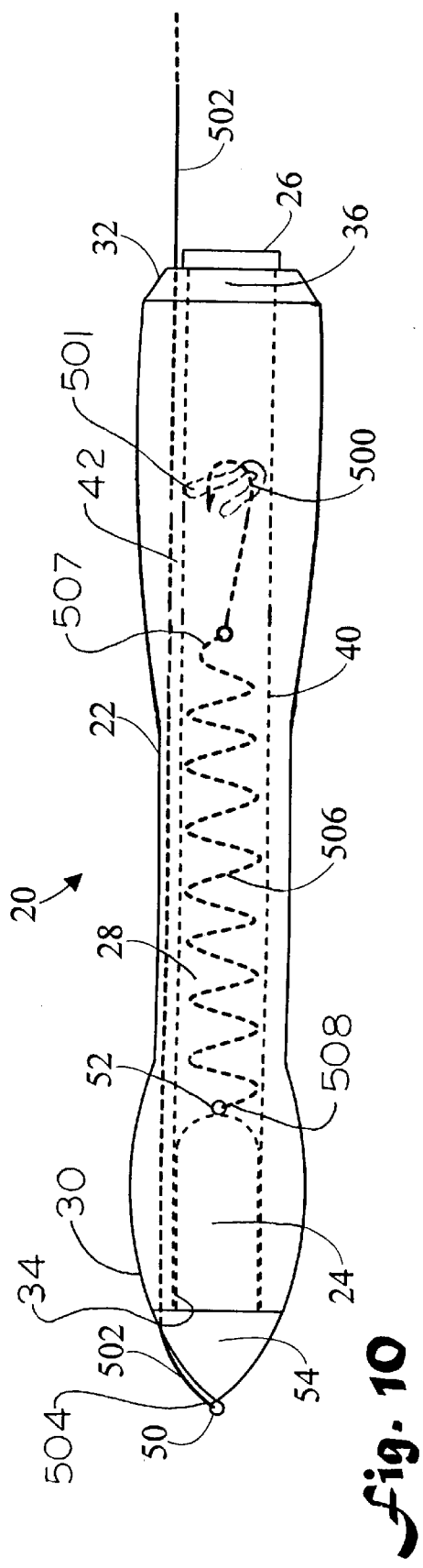

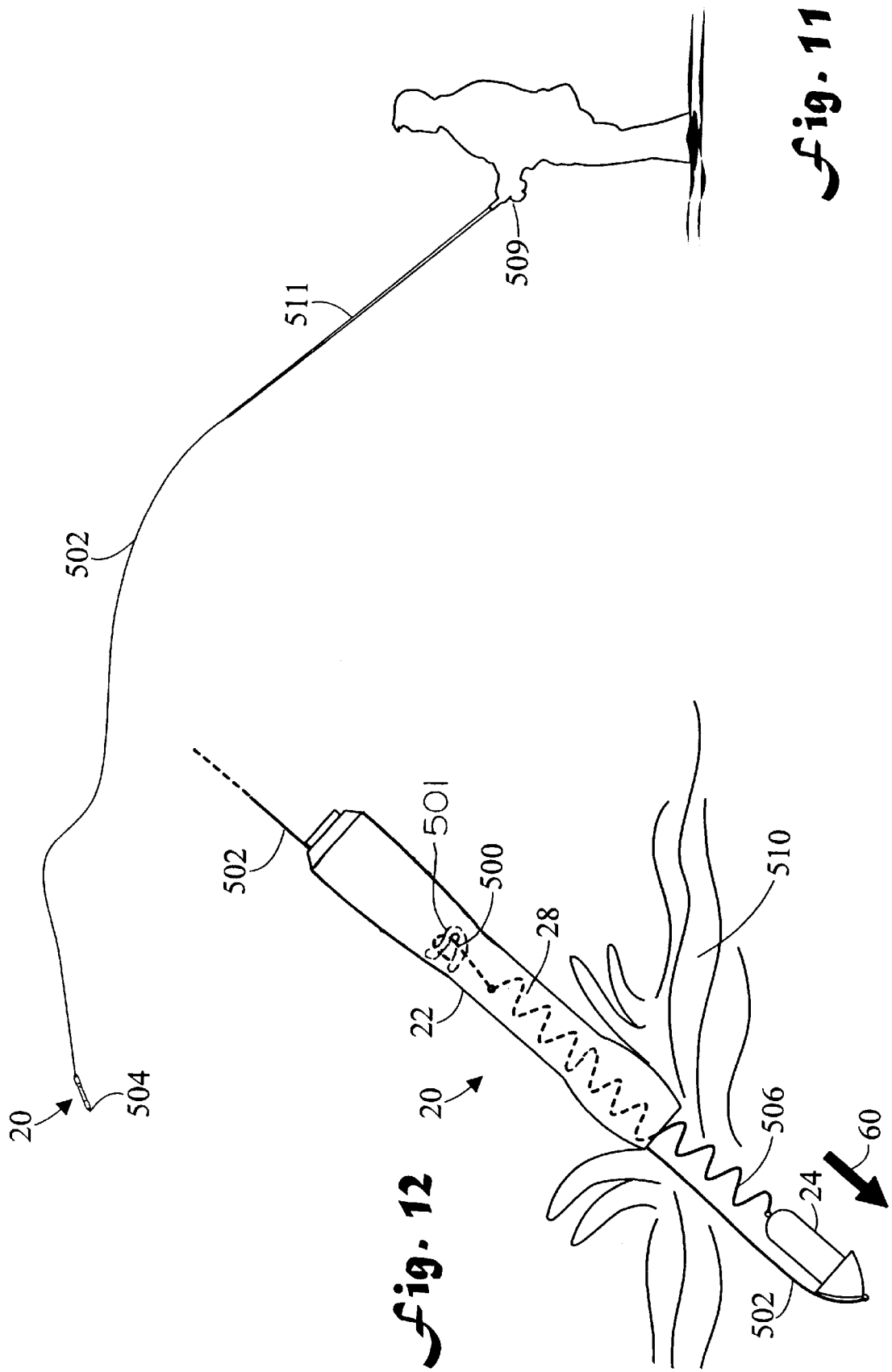

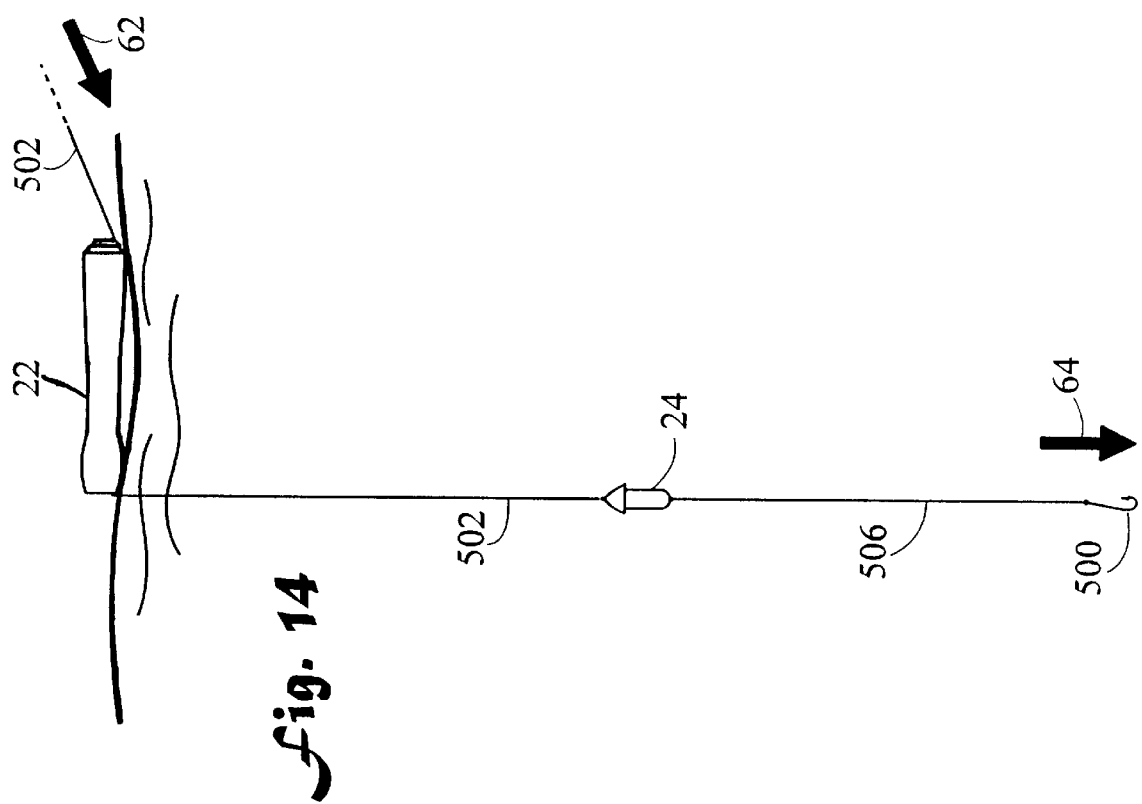
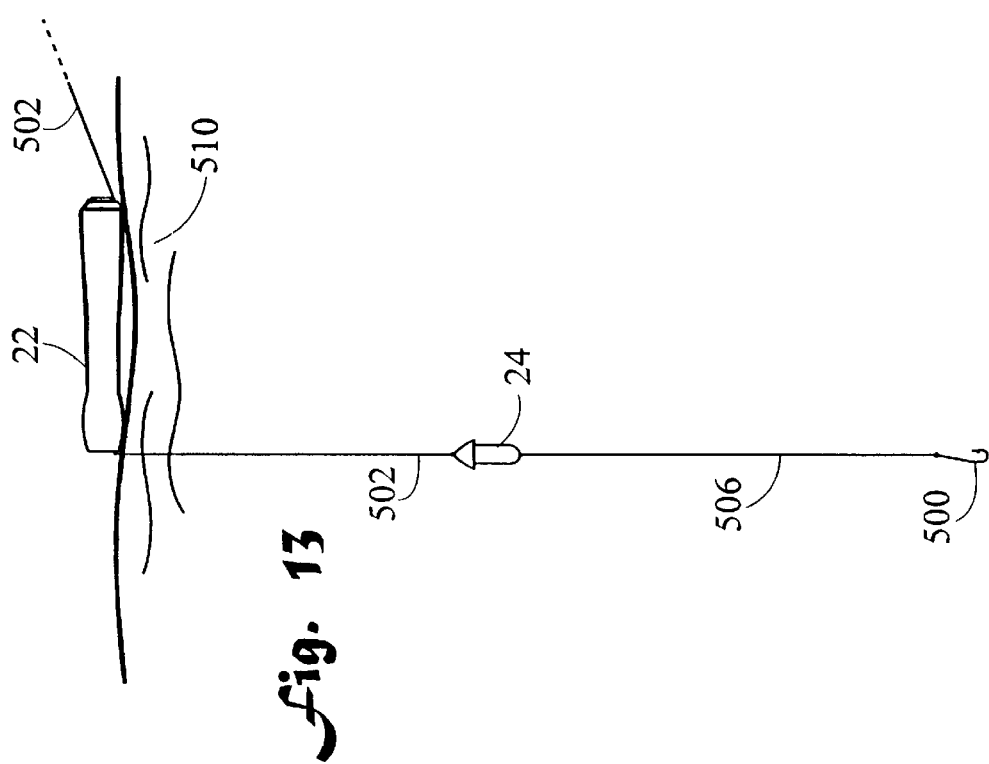

6,094,853

FLOATING BAIT CASTER AND BAIT PROTECTOR WITH DEPTH CONTROL

TECHNICAL FIELD

The present invention pertains to fishing in general, and in particular to an apparatus and method for safely casting a baited fishing hook.

BACKGROUND ART

Fishing-related devices are well known in the art. Such devices range from light weight fly fishing rods, reels, and fishing line to heavy duty deep sea fishing apparatus. In most fishing situations it is advantageous to use the fishing rod to cast a fishing line attached to a sinker and baited hook to a distant point in the water. This overhead casting operation can be performed from a dock or pier, from a boat, from the shoreline, or from a shallow section of water such as in a stream.

If not performed both carefully and skillfully the overhead casting operation represents a significant danger both to the fisherman and nearby individuals. Particularly in the case of casting by inexperienced fisherman in crowded conditions, the unprotected fishhook(s) can easily snag the clothing or body of a person and inflict serious injury. The present invention eliminates this danger by enclosing the baited fishing hook in a streamlined projectile which is cast into the water and separates upon impact.

DISCLOSURE OF INVENTION

The present invention is directed to an apparatus for safely casting a fishing hook attached to a fishing line. The apparatus includes a float which has a fishing hook-receiving cavity, and a sinker which covers and is disengageably received by the cavity. The float is slidably dispositioned along the fishing line. The sinker is attached to the sinker-engaging end of the fishing line and to a leader containing the fishing hook. The fishing hook (preferably baited) and leader are inserted into the cavity in the float, and the sinker is then inserted into the mouth of the cavity. The pull of the fishing line retains the sinker in place in the mouth of the cavity. Thus assembled, the float and installed sinker comprise an aerodynamically streamlined projectile. Using a fishing rod or pole, the projectile is then cast into the water, and upon impact the heavy sinker separates from the buoyant float and deploys the fishing hook in the water. Since throughout the casting operation the fishing hook is contained within the cavity of the float, there is no danger whatsoever of the fishing hook snagging or injuring a person.

While the primary purpose of the present invention is to permit safe overhead casting, the invention includes several other useful features. The fishing line, sinker, and fishing hook are deployed vertically in the water, and therefore have less tendency to snag underwater objects. The float serves to retain the horizontal position of the sinker and fishing hook within the water. The apparatus is a line depth controller wherein the sinker and fishing hook may be moved up or down by appropriately moving the fishing line in or out. The float serves as a marker by providing a visual indication of the location of the sinker and fishing hook. Movement of the float also provides an indication of a strike by a fish. The sinker is coated so as to eliminate environmental contamination. The aerodynamic shape of the projectile can increase casting distance. Through the addition of selectively positioned stops, minimum and maximum fishing depths can be established. And, the apparatus protects bait, especially live bait, inside the cavity of the primary tube as the apparatus flies through the air during casting and hitting the water. At impact with the water, the sinker continues due to inertia since it is on the front of the apparatus dragging the leader, hook, and bait impaled on the hook out of the cavity while the float stays on the surface of the water. The bait encounters the water last pulled along by the hook. In contrast, during ordinary casting the bait sometimes hits the water first causing the bait to dislodge from the hook thereby losing the bait.

In accordance with a preferred embodiment of the invention, an apparatus for casting a fishing hook and fishing line includes a float having a cavity for receiving the fishing hook.

In accordance with another preferred embodiment of the invention, a sinker is received by and disengageably covers the cavity.

In accordance with an important aspect of the invention, the fishing line includes a main line having a sinker-engaging end and a leader having an end, the fishing hook is attached to the leader. The sinker is attached between the sinker-engaging end of the main line and the end of the leader, and the float is slidably dispositioned along the main line.

In accordance with an important feature of the invention, the sinker is fabricated from lead and has a protective coating.

In accordance with an aspect of the invention, a plug selectively closes an opening in the rear end of the float.

In accordance with a feature of the invention, a weight is disposed near the rear end of the float.

In accordance with a preferred embodiment of the invention, the sinker is shaped and dimensioned so as to be disengageably received by the mouth of the cavity, and when so received, the sinker and the float comprising a streamlined projectile.

In accordance with another aspect of the invention, a primary tube is longitudinally disposed along the float to form the cavity. A secondary tube is also longitudinally disposed along the float, and slidably receives the main line.

In accordance with another feature of the invention, a first stop is slidably connected to the main line between the sinker and the front end of the float, and a second stop is slidably connected to the main line between the rear end of the float and the reel end.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is an exploded perspective view of an apparatus for casting a fishing hook and fishing line in accordance with the present invention;

FIG. 2 is a side elevation view of a float;

FIG. 3 is a front end elevation view of the float;

FIG. 4 is a rear end elevation view of the float;

FIG. 5 is a cross sectional view along the line 5—5 of FIG. 4;

FIG. 6 is a side elevation view of a sinker;

FIG. 7 is a front elevation view of the sinker;

FIG. 8 is a rear elevation view of the sinker;

FIG. 9 is a side elevation view of a plug;

FIG. 10 is a side elevation view of the apparatus;

FIG. 11 is a reduced side elevation view of the apparatus being cast by a fisherman;

FIG. 12 is a reduced side elevation view of the apparatus striking the surface of the water;

FIG. 13 is a reduced side elevation view of the apparatus deployed in the water;

FIG. 14 is a reduced side elevation view of the sinker being lowered;

MODES FOR CARRYING OUT TH INVENTION

Figure 17:
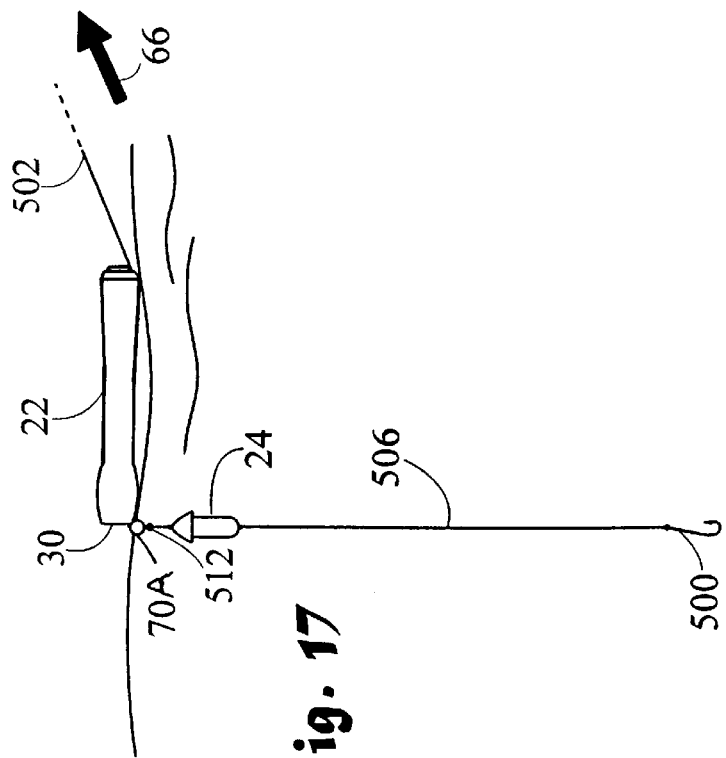
FIG. 17 is a reduced side elevation view of the apparatus including a front stop.

Referring initially to FIG. 1, there is illustrated an exploded perspective view of an apparatus for safely casting a fishing hook and fishing line in accordance with the present invention, generally designated as 20. Apparatus 20 includes a float 22, a sinker 24 which is slidably received by float 22, and a plug 26. Float 20 has a cavity 28 which receives a fishing hook 500 and bait 501 (refer also to FIGS. 2–5). A fishing line includes a main line 502 and a leader 506, the main line having a sinker-engaging end 504 and a reel end 509 (FIG. 11) and the leader 506 having a hook end 507 and a sinker end 508. The fishing hook 500 is attached to the hook end 507 of the leader 506. Sinker 24 is attached between the sinker-engaging end 504 of main line 502 and the leader end 508 of leader 506, and is disengageably installed in and covers cavity 28. Float 22 is slidably disposed along main line 502.

Referring now to FIGS. 2–5, there are illustrated side elevation, front end elevation, rear end elevation, and cross sectional view respectively of float 22. Float 22 has a front end 30 and a rear end 32. Cavity 28 has a mouth 34 which is integral with front end 30. Rear end 32 has an opening 36 to cavity 28. Plug 26 (refer to FIG. 1) is inserted to selectively close opening 36. By removing plug 26, cavity 28 may be more conveniently cleaned. Float 22 is fabricated from a lighter-than-water buoyant material such as styrofoam or rubber, or, alternatively, comprises a hollow body fabricated from a polymer. Float 22 can be of any convenient size, a length of between one and twelve inches being preferred. Also, float 22 can be brightly colored so as to be more visible when deployed in the water.

In a preferred embodiment, cavity 28 is formed from a primary tube 40 which is longitudinally disposed along float 22. A secondary tube 42 is also longitudinally disposed along float 22 and slidably receives main line 502 (refer to FIG. 1). Tubes 40 and 42 can be fabricated from plastic or light weight metal such as aluminum. Secondary tube 42 is preferably glued to primary tube 40 for increased strength and ease of assembly during manufacture.

To ensure stable wobble-free ballistic performance of apparatus 20, it has been found useful to include a weight, such as a lead slug, near rear end 32 of float 22. In a preferred embodiment, weight 44 is disposed within plug 26 (refer to FIGS. 1 and 9).

Referring now to FIGS. 6–8, there are illustrated side elevation, front elevation, and rear elevation views respectively of sinker 24. Sinker 24 is shaped and dimensioned so as to be disengageably received by mouth 34 and cavity 28 of float 22 (FIGS. 1 and 3). The body 45 of sinker 24 slidably fits in mouth 34 and the front portion of cavity 28. The front of sinker 24 includes a nose cone shaped member 54 which is contoured to smoothly interface with front end 30 of float 22, and which includes a lip 56 which prevents sinker 24 from completely entering cavity 28. When sinker 24 is received by mouth 34 of cavity 28 of float 22, sinker 24 and float 22 comprise a streamlined projectile (refer to FIG. 10). Sinker 24 includes a weight 46, such as a lead slug, which is surrounded by a casing or coating 48 such as a polymer. The casing or coating 48 serves to protect the environment from the contaminating effects of the lead. Front eyelet 50 and rear eyelet 52 are made of brass or stainless steel and are used to connect sinker 24 to the main line 502 and leader 506 respectively (refer to FIG. 1). Eyelets 50 and 52 are internally connected within sinker 24 by a wire made of stainless steel, brass, or other corrosion resistant material. Nose cone 54 of sinker 24 includes slots 58 any one of which receives main line 502 when sinker 24 is installed in float 22 (refer to FIG. 1).

FIG. 9 is a side elevation view of plug 26. Plug 26 is a hollow body fabricated from plastic, rubber, or other suitable material, and in a preferred embodiment is press fit into opening 36 of rear end 32 of float 22 (refer to FIG. 10). The hollow body of plug 26 improves the buoyancy of float 22. Also in another embodiment, plug 26 includes weight 44 which ballistically stabilizes the flight of apparatus 20.

FIG. 10 is a side elevation of apparatus 20 in a ready for use configuration. Main line 502 is passed through secondary tube 42 from the rear 32 to the front 30 and the sinker-engaging end 504 is tied on the front eyelet 50 of sinker 24. The leader end 508 of leader 506 is tied to the rear eyelet 52 and the hook end 507 is tied to the fishing hook 500. Bait 501 is impaled onto hook 500. The bait 501, hook 500, leader 506, and sinker 24 are then inserted into cavity 28 of primary tube 40 through mouth 34. As sinker 24 is inserted into mouth 34, it is rotated to pass main line 502 through one of the slots 58 (FIG. 1). Plug 26 has been installed in rear opening 36.

FIG. 11 is a reduced side elevation view of apparatus 20 being cast by a fisherman. Sinker-engaging end 504 of main line 502 is attached to apparatus 20, and reel end 509 of main line 502 is attached to a fishing reel. The streamlined shape of apparatus 20 can increase the casting distance.

FIG. 12 is a reduced side elevation view of apparatus 20 striking the surface of the water 510. When apparatus 20 impacts the surface of the water 510, heavy sinker 24 separates from buoyant float 22 due to inertia pulling leader 506, fishing hook 500, and bait 501 out of cavity 28 in direction 60.

FIG. 13 is a reduced side elevation view of apparatus 20 deployed in the water 510. As it is buoyant, float 22 floats on the surface of the water 510. Sinker 24 sinks freeing fishing hook 500 to sink further down. In this configuration, float 22 serves as a visual marker showing the fisherman the location of his hook 500. Float 22 also provides a visual indication when a fish strikes fishing hook 500 by bobbing vertically and/or moving about. Also, float 22 serves to retain the horizontal position of sinker 24 and fishing hook 500 in the water 510. Without float 22, main line 502 tends to diagonally draw back toward the fisherman over time thereby reducing the distance between the hook and the fisherman until the fisherman is forced to reel the line in and cast it out again. The apparatus 20 keeps the hook 500 in a usable position much longer thereby significantly reducing the number of casts required over a given period of time. An additional advantage is that main line 502, sinker 24, and fishing hook 500 hang substantially vertically from float 22 and are therefore less likely to snag underwater objects than if they were deployed in the convention diagonal fashion.

FIG. 14 is a reduced side elevation view of sinker 24 being lowered with respect to its original position as shown in FIG. 13. Main line 502 has been slidably moved with respect to float 22 in direction 62. Fishing hook 500 and sinker 24 resultantly move down in direction 64.

Figure 15:
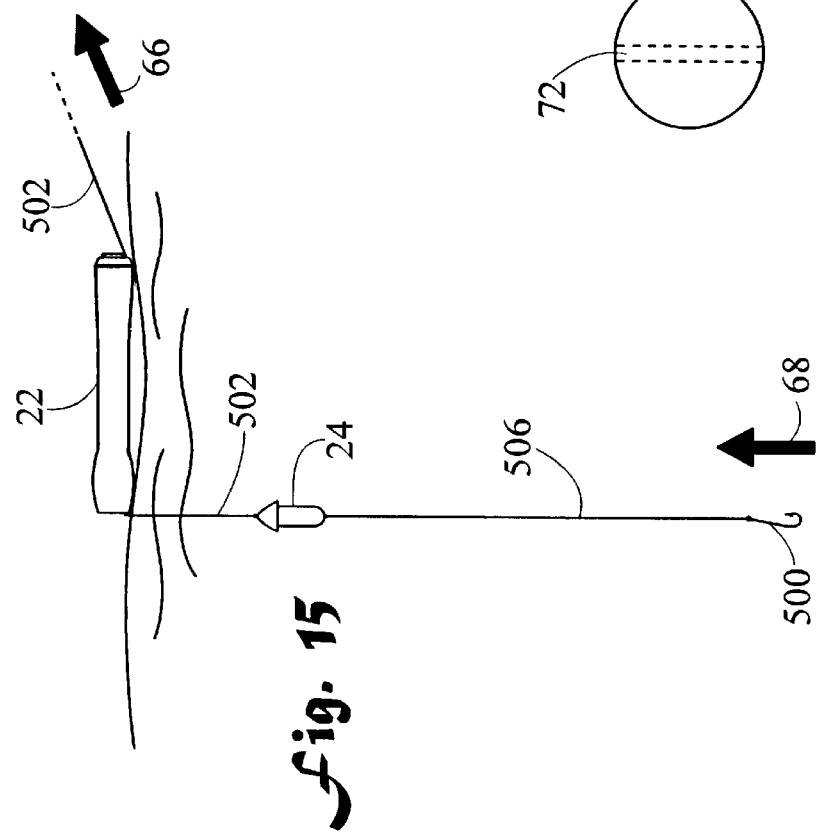
FIG. 15 is a reduced side elevation view of the sinker being raised.

FIG. 15 is a reduced side elevation view of sinker 24 being raised with respect to its original position as shown in FIG. 13. Main line 502 has been slidably moved with respect to float 22 in direction 66. Fishing hook 500 and sinker 24 resultantly move up in direction 68.

Figure 16:
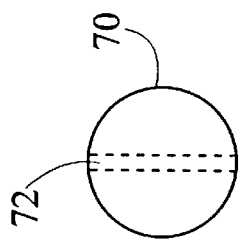
FIG. 16 is an enlarged side elevation view of a stop.

FIG. 16 is a enlarged side elevation view of a stop 70 which can be used on the main line 502 to limit the up and down movement of hook 500 in relation to float 22. Stop 70 is shaped and dimensioned so that it cannot pass through secondary tube 42 (refer to FIG. 2). Stop 70 has a through hole 72 which is slightly larger in diameter than main line 502. In a preferred embodiment, stop 70 is spherically shaped and fabricated from a buoyant material.

FIG. 17 is a reduced side elevation view of the apparatus 20 showing how a front stop 70A is used on line 502. Front stop 70A is slidably connected to main line 502 between sinker 24 and front end 30 of float 22. A first knot 512, which cannot pass through hole 72, is tied in mainline 502 between front stop 70A and sinker 24. As mainline 502 is moved in direction 66, first knot 512 abuttingly engages front stop 70A, which in turn abuttingly engages front end 30 of float 22. In the event that sinker 24 and hook 500 should become detached from mainline 502 due to a snag, fish breaking the line, or other reason, first knot 512 and front stop 70A will prevent float 22 from detaching from mainline 502 and becoming lost. The fisherman merely reels in the float 22 and attaches a new sinker 24, leader 506, and hook 500.

Figure 18:
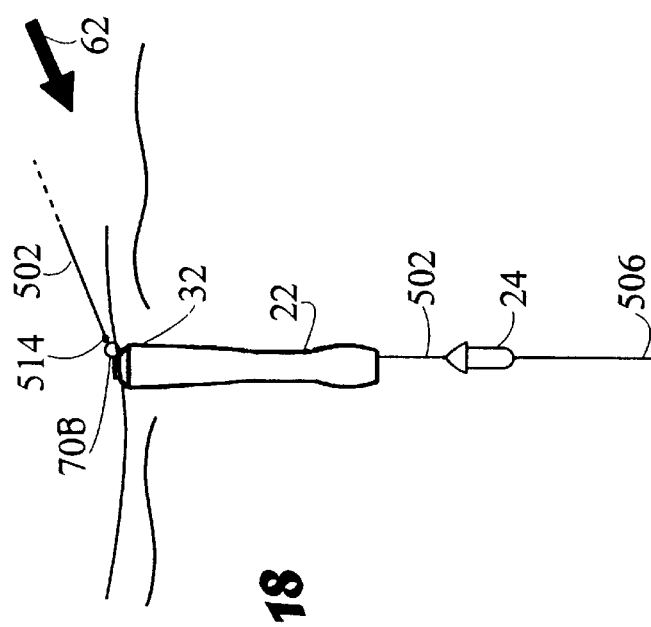
FIG. 18 is a reduced side elevation view of the apparatus including a rear stop; and, FIG. 19 is a side elevation view of a second embodiment having fins.

FIG. 18 is a reduced side elevation view of apparatus 20 showing the use of a rear stop 70B. Rear stop 70B is slidably connected to main line 502 between rear end 32 of float 22 and reel end 509 of main line 502 (refer to FIG. 11). A second knot 514, which cannot pass through hole 72, is tied in main line 502 between rear stop 70B and reel end 509. As mainline 502 is moved in direction 62, second knot 514 abuttingly engages rear stop 70B, which in turn abuttingly engages rear end 32 of float 22. The location of second knot 514 is used to control the maximum depth of fishing hook 500. It may be appreciated that front stop 70A and rear stop 70B may be used singularly or in combination.

Figure 19:
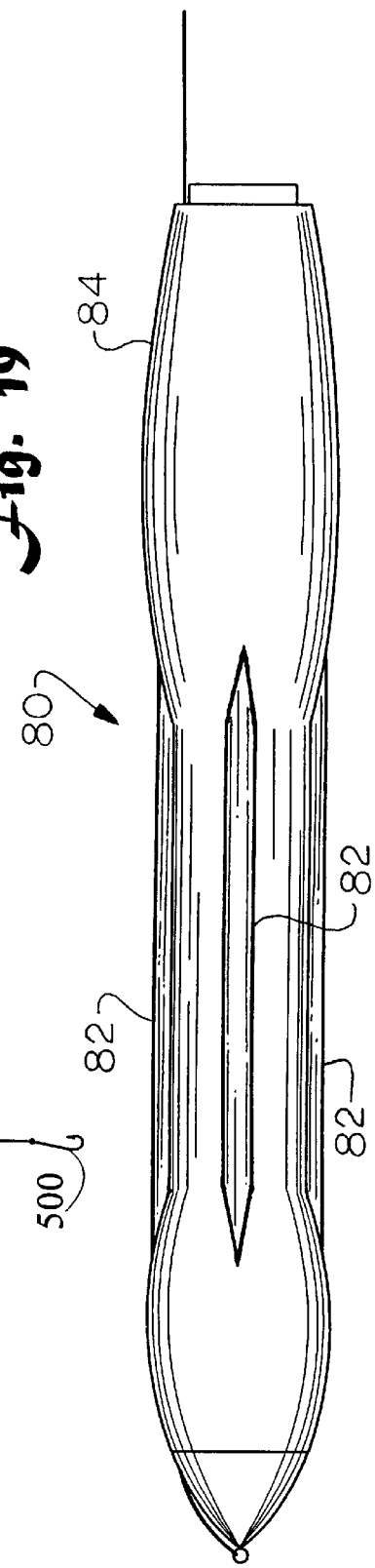

FIG. 19 is a side elevation view of a second embodiment, generally designated 80, of the present apparatus for fishing. A plurality of fins 82 are positioned around the float 84. The fins help stabilize the apparatus 80 during casting. All other aspects of embodiment 80 are the same as for the first embodiment 20.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. Apparatus for casting a fishing hook and fishing line, the fishing line including a main line and a leader, the main line having a sinker-engaging end and a reel end and the leader having a sinker end and a hook end, the fishing hook attachable to the leader, said apparatus, comprising:

a float having a cavity for receiving the fishing hook;

said cavity having a mouth;

a sinker disengageably covering said mouth;

said sinker having a front eyelet attachable to the sinker-engaging end of the main line and a rear eyelet attachable to the sinker end of the leader;

said float further including, a front end and an opposite rear end. and an elongated shape between said front end and said rear end;

said float further including an opening at said rear end into said cavity; and, a plug for selectively closing said opening.

2. Apparatus according to claim 1, wherein said sinker has a coating.

3. Apparatus according to claim 1, further including a weight disposed in said plug.

4. Apparatus according to claim 1, further including a weight disposed near said rear end.

5. Apparatus according to claim 1, wherein said sinker is shaped and dimensioned so as to be disengageably received by said mouth of said cavity.

6. Apparatus according to claim 5, further including:

a primary tube longitudinally disposed within said float along said elongated shape forming said cavity; and, a secondary tube longitudinally disposed along said float for slidably receiving the main line.

7. Apparatus for casting, a fishing line, and a fishing hook, comprising:

a fishing line;

a fishing hook coupled to said fishing line;

an apparatus including a float having a cavity receiving said fishing hook, said cavity having a mouth;

said fishing line including a main line and leader, said main line having a sinker-engaging end and a reel end, and said leader having a sinker end and a hook end;

said float including a front end and a rear end spaced from said front end, said mouth disposed at said front end;

a primary tube longitudinally disposed along said float forming said cavity;

a sinker having a front eyelet coupled to said sinker-engaging end and a rear eyelet coupled to said sinker end;

said fishing hook coupled to said hook end;

said cavity receiving said sinker, leader, and fishing hook through said mouth and said sinker closing said mouth; and, a secondary tube coupled to said float from said front end to said rear end, and said main line slidably passing through said secondary tube.

8. Apparatus for casting, a fishing line, and a fishing hook, according to claim 7, further including a front stop connected to said main line between said sinker and said front end.

9. Apparatus for casting, a fishing line, and a fishing hook, according to claim 8, further including a rear stop connected to said main line between said rear end and said reel end to limit movement of said hook away from said rear end.

* * * * *